Oct. 1, 1957   G. O. ARVIDSON   2,808,020
BUTTERING DEVICE
Filed July 15, 1955

Inventor
George O. Arvidson
By McCanna and Morsbach
Attys.

United States Patent Office 2,808,020
Patented Oct. 1, 1957

2,808,020
BUTTERING DEVICE
George O. Arvidson, Rockford, Ill.
Application July 15, 1955, Serial No. 522,321
3 Claims. (Cl. 118—13)

This invention relates to kitchen utensils and particularly to a device for applying butter to corn-on-the-cob.

An important object of this invention is to provide an improved device for applying a uniform and controlled amount of butter or the like to an ear of corn.

Another object of this invention is to provide a device which applies melted butter to the underside of an ear of corn and which will, during the buttering operation, spread or remove any excess butter that runs to the underside of the ear thereby minimizing dripping of butter from the ear of corn.

A more particular object of this invention is to provide a buttering device for applying melted butter to an ear of corn and including a receptacle for the melted butter and a roller for applying the butter from the receptacle to an ear of corn, which device is arranged so that substantially all of the butter may be dispensed from the receptacle and applied in a uniform coating to the ear of corn thereby permitting the use of very small quantities of butter in the device.

A further object of this invention is to provide a buttering device which may be readily disassembled and cleaned to facilitate maintaining the device in a sanitary condition.

These, together with various ancillary objects and advantages of this invention will be more readily appreciated as the same becomes better understood by reference to the following detailed description when taken in connection with the accompanying drawings wherein.

Figure 1:
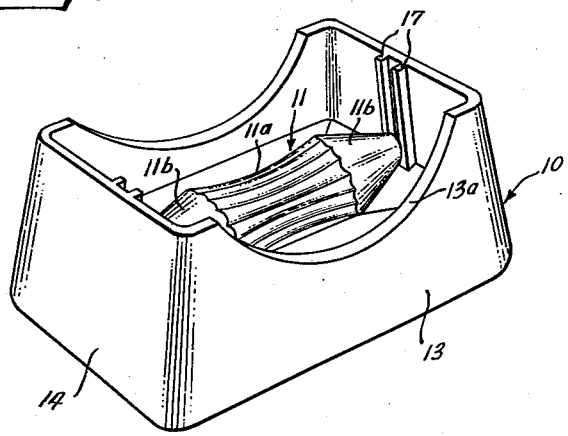
Figure 1 is a perspective view of the buttering device.
Figure 2:
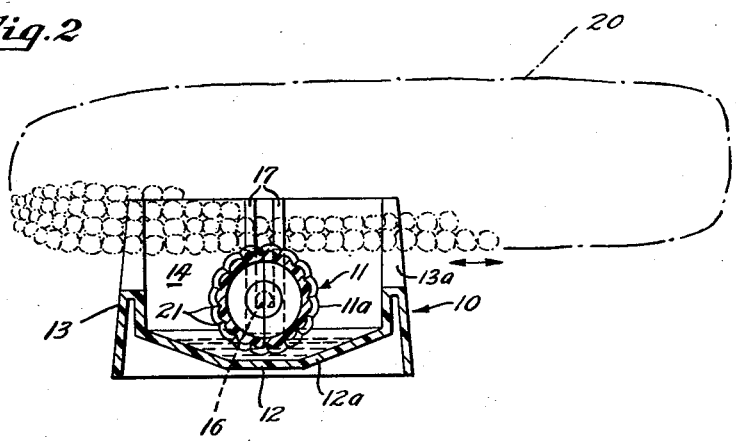
Fig. 2 is a transverse sectional view of the buttering device illustrating the latter in use buttering an ear of corn.
Figure 3:
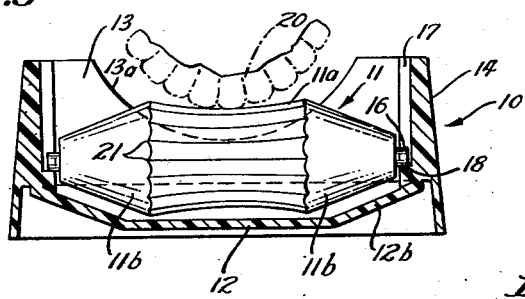
Fig. 3 is a longitudinal sectional view through the buttering device.

Referring now more specifically to the accompanying drawings there is illustrated a buttering device including a receptacle designated generally by the numeral 10, which receptacle has a dispensing roller 11 mounted therein. The receptacle includes a bottom wall 12 and upstanding side and end walls 13 and 14 respectively. The receptacle is preferably molded in one piece, of plastic or the like, and, as shown, the side and end walls terminate in a common plane at the lower end thereof and form a base for the receptacle to support the latter on a supporting surface such as a table. The bottom wall 12 is molded integrally with the side and end walls and, as shown in Figs. 2 and 3, joins the latter at a point spaced above the lower edge of the side and end walls. The bottom wall includes downwardly and inwardly sloping side portions 12a and downwardly and inwardly sloping end portions 12b to form a shallow trough arranged to convey the melted butter or the like in the receptacle toward the center thereof.

The roller 11 is also preferably molded of plastic or the like and as shown is formed with integral trunnions 16 on opposite ends thereof and a pair of spaced ribs 17 are formed on the registering faces of the end walls to slidably and rotatably receive the trunnions. A fillet 18 is formed between the lower ends of the ribs 17 to engage the trunnions 16 and support the roller with the periphery thereof disposed in closely spaced adjacency to the bottom wall 12. As is apparent, the trunnions are slidable between the ribs 17 so that the roller 11 may be readily inserted and removed from the receptacle to facilitate cleaning of the buttering device.

The diameter of the roller 11 is preferably made small to minimize the distance through which the butter must be carried from the receptacle to the top of the roller where it is applied to the ear of corn. For reasons set forth more fully hereinafter, the roller is formed with a longitudinally concave intermediate portion 11a which has a radius of curvature which is large as compared to the radius of the roller and somewhat larger than the radius of the ears of corn to be buttered on the device. The end portions 11b of the roller taper from the intermediate portion 11a inwardly towards the ends of the roller to provide clearance between the roller and the downwardly inclined end portions 12b of the bottom wall 12.

The longitudinally concave intermediate portion of the roller facilitates centering of the ear of corn on the roller and also increases the area of contact therewith. A plurality of grooves or flutes 21 are formed in the periphery of the intermediate portion 11a of the roller and extend longitudinally of the roller. These grooves or flutes increase the traction between the roller and the ear of corn to assure rotation of the roller as the ear of corn is reciprocated therealong. The flutes or grooves also assist in raising the butter from the receptacle and, particularly when the liquid level in the receptacle is very low so that only the ends of the longitudinally concave intermediate portion extend into the butter, the flutes aid in distributing the butter uniformly along the roller. Under these conditions, the opposed ends of the intermediate portion dip into the butter, as the roller is turned. As the butter in the grooves is raised to a point above the axis of the roller, the butter at the ends of the intermediate portion 11a tends to flow longitudinally of the roller in the passages formed by the flutes instead of flowing circumferentially around the roller as would occur with a smooth roller. This distributes the butter more uniformly along the roller and assures a proper coating on the ear of corn even when the level of the butter in the receptacle is very low. It is, therefore, unnecessary to maintain a high liquid level in the receptacle in order to provide proper buttering of the ear of corn.

The side and end walls 13 and 14 respectively preferably extend above the roller and the side walls are formed with a concave upper edge 13a which curve downwardly to a level below the concave intermediate portion 11a of the roller. The curved upper edges 13a of the side walls are thus arranged to function as a guide for the ear of corn 20 to aid in maintaining the latter positioned properly on the roller.

In operation, a small quantity of melted butter or the like is placed in the receptacle. The ear of corn 20 is then reciprocated longitudinally over the roller 11 and turned about its axis as it is reciprocated until the entire surface of the ear of corn has contacted the roller. As the ear of corn is reciprocated over the roller, the ridges formed between the flutes or grooves in the periphery of the intermediate portion 11a engage the kernels on the corn to cause the roller to rotate. The roller, in turn, carries the butter on its periphery up to the ear of corn and applies a uniform coating on the underside of the latter. Any excess butter which is applied to the ear of corn will form droplets and run to the underside of the ear whereby upon a subsequent reciprocation of the ear of corn, the droplets will contact the roller and are spread thereby. The circumferential spacing of the grooves 21 and the depth of the latter is preferably made such that the ridges formed by the grooves tend to intermesh with the transverse rows of kernels on the ear of corn and apply butter to the spaces between these kernels thereby effecting a more complete covering of each of the kernels on the ear of corn. As the level of the butter in the receptacle lowers, the downwardly inclined side and end portions 12a and 12b of the bottom wall convey the butter towards the lower periphery of the roller. When the butter level lowers to a point at which only the ends of the longitudinally concave intermediate portion 11a of the roller extend into the butter, some of the butter adheres to these ends, as the roller is turned and dips into the butter. When the butter reaches the upper side of the roller, it flows longitudinally in the grooves or flutes 21, thereby distributing the butter uniformly over the intermediate portion of the roller.

Since the roller will dispense nearly all of the butter from the receptacle, there is little waste. When cleaning the device, the roller may be readily removed by withdrawing the same from between the ribs 17 to facilitate the cleaning operation.

I claim:

1. In a device for applying butter to corn-on-the-cob, a self-supporting receptacle molded in one piece and having upstanding side and end walls adapted to rest on a supporting surface, a bottom wall formed integrally with said side and end walls and joined with the latter at a point spaced above the lower edge thereof, said bottom wall having side and end portions sloping downwardly and inwardly from said side and end walls and defining an elongated shallow trough, an elongated roller rotatably mounted on said end walls to have the periphery thereof extend into closely spaced adjacency to the bottom wall and adapted to pick up butter from the receptacle and apply the butter to an ear of corn, said roller having a longitudinally concave portion intermediate the ends thereof, the radius of said roller being small as compared to the radius of curvature of said longitudinally concave portion, said concave portion having grooves formed in the periphery thereof and extending longitudinally of the roller to spread the butter along said concave portion, the end portions of said roller tapering from the intermediate portion inwardly toward the ends of the roller, the upper edge of said side walls curving downwardly to a point below the level of said concave intermediate portion of the roller to form a guide for maintaining an ear of corn centered on the concave portion of the roller.

2. In a device for applying butter to corn-on-the-cob, a self supporting receptacle molded in one piece and having upstanding side and end walls adapted to rest on a supporting surface, a bottom wall formed integrally with said side and end walls and joined with the latter at a point spaced above the lower edge thereof, said bottom wall having side and end portions sloping downwardly and inwardly and defining an elongated shallow trough, an elongated roller rotatably mounted on said end walls to have the periphery thereof extend into closely spaced adjacency to the bottom wall and adapted to pick up butter from the receptacle and apply the butter to an ear of corn, said roller having a longitudinally concave portion intermediate the ends thereof, the radius of said roller being small as compared to the radius of curvature of said longitudinally concave portion, said concave portion having grooves formed in the periphery thereof and extending longitudinally of the roller to spread the butter along said concave portion.

3. The combination of claim 2 wherein the upper edge of said side walls curves downwardly to a point below the level of the concave intermediate portion of the roller to form a guide for maintaining an ear of corn centered on the concave portion of the roller.

References Cited in the file of this patent

UNITED STATES PATENTS

| | | |
|---|---|---|
| 764,796 | Davis | July 12, 1904 |
| 957,961 | Hooper | May 17, 1910 |
| 989,685 | Zittle et al. | Apr. 18, 1911 |
| 1,127,165 | Berger | Feb. 2, 1915 |
| 1,170,964 | Crocker | Feb. 8, 1916 |
| 1,270,234 | Storjohann | June 18, 1918 |
| 1,933,071 | Reins et al. | Oct. 31, 1933 |
| 2,196,647 | Snyder et al. | Apr. 9, 1940 |
| 2,336,073 | Cloutier | Dec. 7, 1943 |